United States Patent [19]
Ehdaie et al.

[11] Patent Number: 5,546,310
[45] Date of Patent: Aug. 13, 1996

[54] GHEBLEH BEARING INDICATOR

[76] Inventors: Seyf-Ollah Ehdaie, 6315 Mecca St.;
Firooz Khosraviyani, 6401 Opal Dr.,
both of Odessa, Tex. 79762

[21] Appl. No.: 872,412

[22] Filed: Apr. 23, 1992

[51] Int. Cl.$^6$ .................................................. G01C 21/00
[52] U.S. Cl. ........................... 364/449; 364/460; 364/559
[58] Field of Search ............................ 364/449, 457,
364/460, 559, 709.14, 709.15, 729, 444;
33/355 R, 361, 316, 320

[56] References Cited

U.S. PATENT DOCUMENTS

| | | | |
|---|---|---|---|
| 4,220,994 | 9/1980 | Hendrickson | 364/450 |
| 4,372,052 | 2/1983 | Wakim | 33/349 |
| 4,403,291 | 9/1983 | Von Tomkewitsch | 364/424 |
| 4,435,760 | 3/1984 | Kuno et al. | 364/444 |
| 4,497,034 | 1/1985 | Kuno et al. | 364/571 |
| 4,512,667 | 4/1985 | Doulton et al. | 368/10 |
| 4,560,930 | 12/1985 | Kouno | 324/207 |
| 4,642,776 | 2/1987 | Matsumoto et al. | 364/449 |
| 4,659,231 | 4/1987 | Barkouki | 368/15 |
| 4,663,719 | 5/1987 | Matsumoto et al. | 364/444 |
| 4,694,583 | 9/1987 | Blaney | 33/361 |
| 4,763,268 | 8/1988 | Itoh et al. | 364/449 |
| 4,814,989 | 3/1989 | Döbereiner et al. | 364/444 |
| 4,977,509 | 12/1990 | Pitchford et al. | 364/449 |
| 5,067,081 | 11/1991 | Person | 364/444 |
| 5,146,231 | 9/1992 | Ghaem et al. | 342/419 |
| 5,173,709 | 12/1992 | Lauro et al. | 342/443 |

*Primary Examiner*—Michael Zanelli
*Attorney, Agent, or Firm*—Aquilino & Welsh

[57] ABSTRACT

A Ghebleh bearing indicator apparatus for providing a user with a displayed indication of the relative bearing between his current position and a destination, such as Mecca, includes a keyboard and display. A microprocessor processes selected stored latitude/longitude information for one of a plurality of cities along with information from an included electronic digital compass to calculate and display the bearing to Mecca on a compass rose. The apparatus includes a preprogrammed list of up to eight cities which, in one operational mode, allows an unsophisticated user to select a location merely by pressing a single key on the keyboard. In a second mode, a plurality of countries and associated cities is scrolled on the screen to permit highlighting and selection by the user.

13 Claims, 4 Drawing Sheets

GHEBLEH BEARING INDICATOR

BACKGROUND OF THE INVENTION

The present invention relates to a personal, portable bearing indicator for indicating the bearing to Mecca, or to another religiously significant location, such as Jerusalem for example, during periods of prayer.

Islam is the world's second largest religion, encompassing some 800 million practitioners, known as Muslims. The faith is based upon the teachings and revelations of Mohammed the prophet who lived in the region now known as Saudi Arabia. Muslims believe that the archangel Gabriel descended to earth to give Mohammed the revelation that there is only one God and directed him to clear the Kaaba (a cube-like rock shrine believed to have been erected to God by Abraham) in the city of Mecca of all idols and consecrate it to the worship of the one God. After a period of exile, Mohammed is believed to have returned to Mecca and accomplished Gabriel's directive. In doing so, Mohammed directed all of his followers to hold the Kaaba sacred and dedicated it as the true House of God.

Based upon these beliefs, Islam has developed the tradition of the Haj wherein all of the faithful are expected to visit the holy city of Mecca once during their lives and perform a ritual encompassing about two weeks. In addition to this requirement, Muslims are expected to engage in prayers to Allah, the one God, five times every day. During these prayer periods, Muslims must face in the direction of Mecca and the Kaaba. This direction, from anywhere on earth, is universally known as "Ghebleh".

While this requirement presents no particular problem to Muslims in their customary homes and offices, travelers are constantly faced with the problem of locating the correct bearing for Mecca, sometimes from as many as five different locations in a day. Previously, the traveling Muslim was left either with merely estimating the correct bearing by facing roughly East or West, for example, or by carrying complex tables of latitude/longitude locations which give the bearing of Mecca from any point on Earth. Along with these tables, the traveler must carry an accurate compass to translate the bearing into a proper praying orientation.

At least one attempt (Itoh et al., U.S. Pat. No. 4,763,268) has been made to automate the process, at least for a traveler in an automobile. This complex apparatus requires installation in the automobile and the traveler must enter a map reference based upon 16 different compass direction pie segments irradiating from Mecca. The result is a cumbersome operation which still requires the traveler to have a basic frame of reference derived from a chart. In reality, this system is only good for an area encompassing a radius of a few hundred miles from Mecca. Furthermore, it involves the use of an automobile and requires some rather complex input from the operator, rendering it unsuitable for a relatively unsophisticated user.

It is clear then, that a need exists for a compact, portable, personal bearing indicator apparatus for indicating the correct bearing to Mecca from any desired position. The bearing indicator should be reliable, durable, and capable of operation by someone who is minimally educated and unsophisticated or even illiterate. The apparatus should also incorporate a compass so that the correct orientation of the apparatus relative to magnetic or true north is readily available for calculation and display purposes.

SUMMARY OF THE INVENTION

The present invention is a portable bearing indicating apparatus for enabling a user to quickly and accurately determine the bearing to Mecca, i.e. Ghebleh, for purposes of prayer. The apparatus includes a microprocessor for calculating the bearing to Mecca based upon the latitude and longitude position of the user, a keyboard for inputting such information and an electronic compass for providing orientation information about the apparatus to the microprocessor for translating the calculated bearing into the proper prayer orientation for the user. A ROM stores up to 1200 city locations in latitude/longitude format and a RAM has eight preprogrammed memory locations which store eight preprogrammed locations associated with eight corresponding keys on the keyboard. A display screen is provided for displaying the location data being input as well as a compass rose and bearing indicator. The display, upon initial power-up, displays a menu of eight city locations associated with the eight preprogrammed keys. At this point, in a first operational mode, the selection of any one of the eight preprogrammed keys causes the microprocessor to load the preprogrammed latitude/longitude data associated with that key along with the orientation information from the electronic compass. In response to a select key, the microprocessor then calculates and displays the bearing to Mecca from the selected location. This first mode is ideal for a user who is somewhat unsophisticated but who is capable of associating eight keys with eight cities, either by memory or by reference to the displayed menu. In an alternative mode, a list of countries is scrolled on the display until the proper one appears. This country can be selected by the user via a cursor after which a list of cities is scrolled on the display. Selection of a city causes the latitude/longitude information for that city to be loaded and the bearing to Mecca calculated and displayed as before. The preprogrammed keys used in the first operational node can be reprogrammed at any time by selecting a city via the second mode and storing the selected city in any one of the preprogrammed key locations. The apparatus can be preprogrammed for operation in two different languages. The apparatus can be converted into a magnetic compass mode at any time merely by pressing a selected compass key.

As an optional feature, a numeral keyboard section can be added which allows a user to enter as many as ten different latitude/longitude locations in a user specific memory location for recall in computing the bearing to Mecca. It should be noted that the apparatus can be optionally preprogrammed to indicate the bearing to a location other than Mecca in response to a special key on the keyboard.

The principle objects of the present invention are to provide an improved portable Ghebleh bearing indicator apparatus; to provide such an apparatus which has a built-in electronic compass for indicating the current orientation of the apparatus relative to the magnetic north pole; to provide such an apparatus which automatically calculates the bearing to Mecca or, optionally, to another location when prompted by information indicating the current location of the apparatus; to provide such an apparatus in which a plurality of preprogrammed locations are associated with individual keys on a keyboard to provide a Ghebleh indicating capability in a first operational mode; to provide such an apparatus in which a particular country and city location can be selected from a scrolled list to provide an expanded Ghebleh indicating capability in a second operational mode; to provide such an apparatus in which the preprogrammed locations of the first mode can be easily reprogrammed via the scrolling operation of the second mode; to provide such an apparatus in which a microprocessor calculates the correct bearing to Mecca based upon the input city information, senses the current orientation of the apparatus from the built-in electronic compass and displays the correct bearing on a compass rose so that the user can correctly orient himself for prayer; to provide such an apparatus which is ideally suited for use with an unsophisticated user; and to provide such an apparatus which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
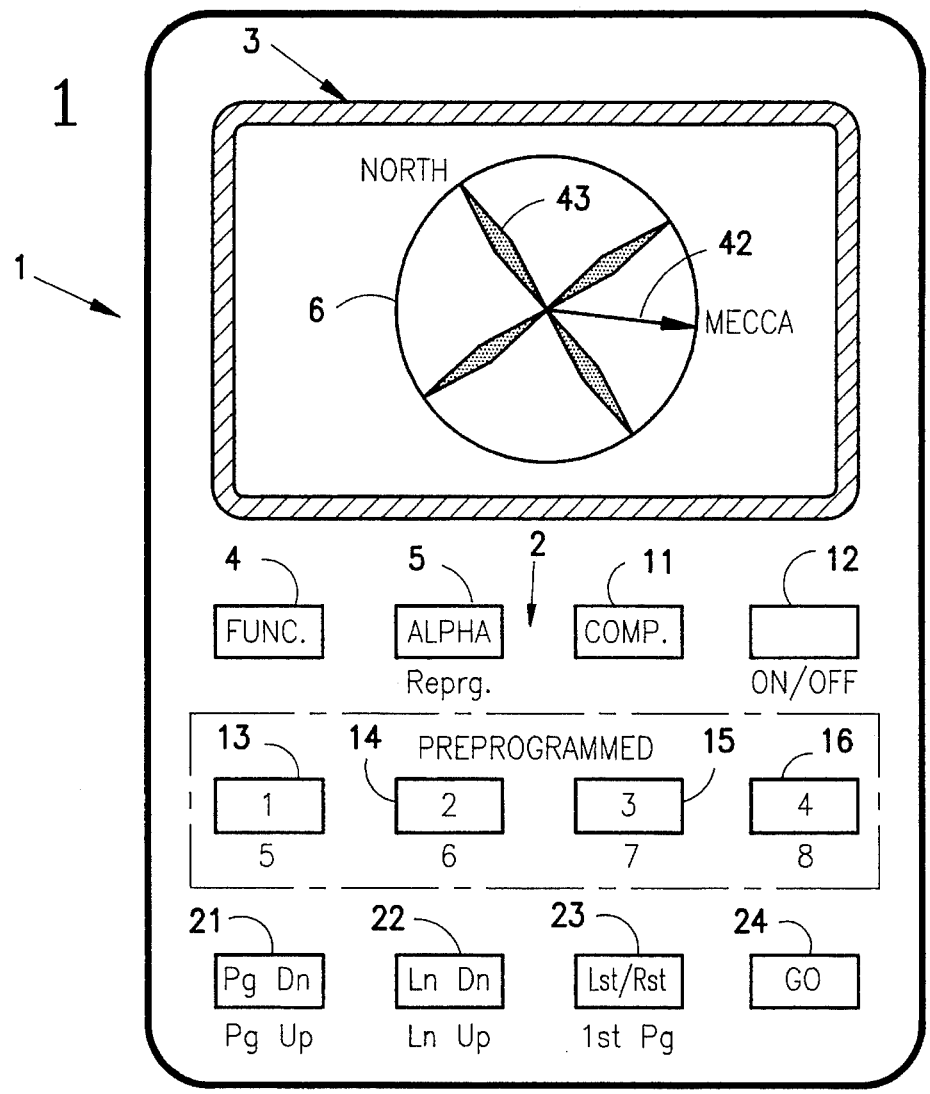
FIG. 1 is a top plan view of a Ghebleh indicator in accordance with the present invention showing one arrangement for the keyboard and showing a displayed compass rose with magnetic North and the bearing of Mecca indicated thereon.

Referring to FIG. 1, there is shown a personal, portable, battery-operated Ghebleh indicating apparatus 1 including a keyboard 2 and a display 3 displaying a compass rose 6. The display 3 is preferably a liquid crystal display for conservation of battery power. The keyboard 2 comprises 12 keys arranged in a 3×4 matrix which will now be described.

The upper left key 4 is a function key labeled "FUNC" for switching the other keys between the dual displayed functions. The next key 5 is a dual function key labeled "ALPHA" and "REPRG". In the Alpha mode, this key switches the apparatus between two different preprogrammed languages, e.g. English and Arabic. The Reprogram mode will be described below. Next is the COMP key 11 which switches the apparatus between the normal Ghebleh bearing computing mode and a compass mode in which the display is used for displaying merely the compass rose 6 and the bearing of true north. The ON/OFF key 12 is merely a power switch. The next row of keys 13–16 are located within an area marked "preprogrammed". Each of the keys 13–16 is a dual function key with dual numbers which each represent a memory location in which a city location is prestored. Upon power up, a menu is initially displayed which lists the eight city locations and their corresponding preprogrammed key number. A corresponding location is recalled with the operation of any one of the keys 13–16, in either function. The last row of keys 21–24 will now be described.

The key 21 is a dual function cursor control key for scrolling the screen up or down one page while the key 22 is a similar line up/line down cursor control. The key 23 is another dual function key. The function labeled as LST/RST alternatively calls up the country list when the apparatus is in the power-up menu mode and recalls the power-up menu mode when the apparatus is in the country list mode. The "1st Pg" function merely shifts the displayed list back to the first page. The SELECT key 24 selects the highlighted country and/or city currently being displayed for loading and initiates the Mecca bearing calculation and display. The REPRG function for the key 5 is used to reprogram the preprogrammed list of cities. To do so, the REPRG key is pushed after a city is highlighted with the cursor. The desired preprogrammed location is then selected via the keys 13–16 and the highlighted city location is automatically stored in the selected preprogrammed memory location and displayed in the power-up menu.

Figure 2:
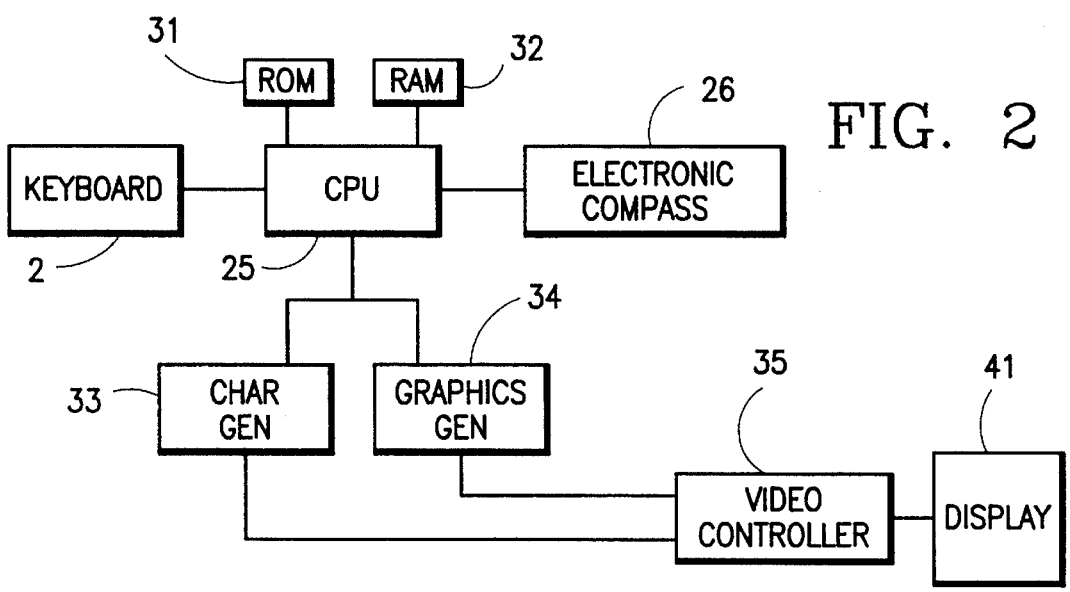
FIG. 2 is a block diagram of a Ghebleh indicating apparatus in accordance with the present invention.

FIG. 2 is a block diagram of the Ghebleh indicator of FIG. 1. A microprocessor CPU 25 is connected to the keyboard 2 and to an electronic digital compass 26. The electronic digital compass can be of the type produced and marketed by KVH Industries under the model name KVH C100. A conventional ROM 31 is provided for storing the operational program and the permanent country/city list while a RAM 32 is provided for working memory and for storing the preprogrammed city list. A character generator 33 and a graphics generator 34 are connected between the CPU 25 and a video controller 35. A display 41 is connected to the video controller 35 for displaying the menu lists and the compass rose indicator.

The CPU 25 calculates the bearing of Mecca from three known variables, i.e. the latitude/longitude information for Mecca, which is preprogrammed, the latitude/longitude information for the current location, which is input by the user via the keyboard 2, and the current orientation of the apparatus relative to magnetic North, which is input by the electronic compass 26.

The electronic compass 26 sends, continuously, the angle between the vertical sides of the apparatus 1 and the bearing to the magnetic north pole.

Assuming that the bearing AM between the current location and Mecca is needed, first the bearing to the geographic or true North pole is calculated from the known location of the apparatus. Then, based upon spherical geometry, for any spherical triangle such as PAM, the following relationships exist:

$$\tan[(A+M)/2]=\cos[(a-m)/2]\cot(P/2)/\cos[(a+m)/2] \qquad (1)$$

$$\tan[(A-M)/2]=\sin[(a-m)/2]\cot(P/2)/\sin[(a+m)/2] \qquad (2)$$

where P, A, and M stand for the respective angles between locations, (north pole, current location and Mecca) and p, a, and m represent the sides facing the angles P, A, and M, respectively. If sides a and m and the angle P are known, then the triangle can be solved for the remaining values including the angle A which will give the bearing AM.

Fixing the vertices of the triangle on the geographic north pole, Mecca and the current location, the parameters a, m and P can be calculated as follows:

$$a = \pi/2 - 1_M \quad (3)$$

$$m = \pi/2 - 1_A \quad (4)$$

$$P = L_A - L_M \quad (5)$$

where l and L stand for latitude and longitude, respectively of the corresponding subscripted locations.

The angle A can then be computed by $$A = (A+M)/2 + (A-M)/2 \quad (6)$$

as derived by taking the arc tangents of the values calculated from equations (1) and (2).

Thus, the bearing to Mecca can be computed from any location on Earth provided that the bearing to geographic north is known. It should be noted that the bearing to geographic north can be computed in the same manner from the known current location and the bearing to magnetic north output by the compass 26.

For example, assuming that the current location is in the city of Tehran with the following information:

latitude=35°41'38"
longitude=51°25'58"

The same information for Mecca is latitude=21°25'00"
longitude=39°50'00"

Thus, a=90°/2−21°25'00"=68°35'00"
m=90°/2−35°41'38"=54°18'22"
P=51°25'58"−39°50'00"=11°35'58"

By plugging these values in equations (1) and (2):

tan[(A+M)/2]=(cos 7°8'19") (cot 5°47'59")/cos 61°24'41"=20.4151

(A+M)/2=87°11'44"

tan[(A−M)/2]=(sin 7°8'19") (cot 5°47'59")/sin 61°24'41"= 1.3934

(A−M)/2=54°20'00"

Plugging these values into equation (6) yields

A=141°30'4.4".

This bearing is then displayed on the compass rose 6 as an arrow 42 and the label "Mecca" as shown in FIG. 1, with the angle of true north 43 displayed as well.

Figure 3A:
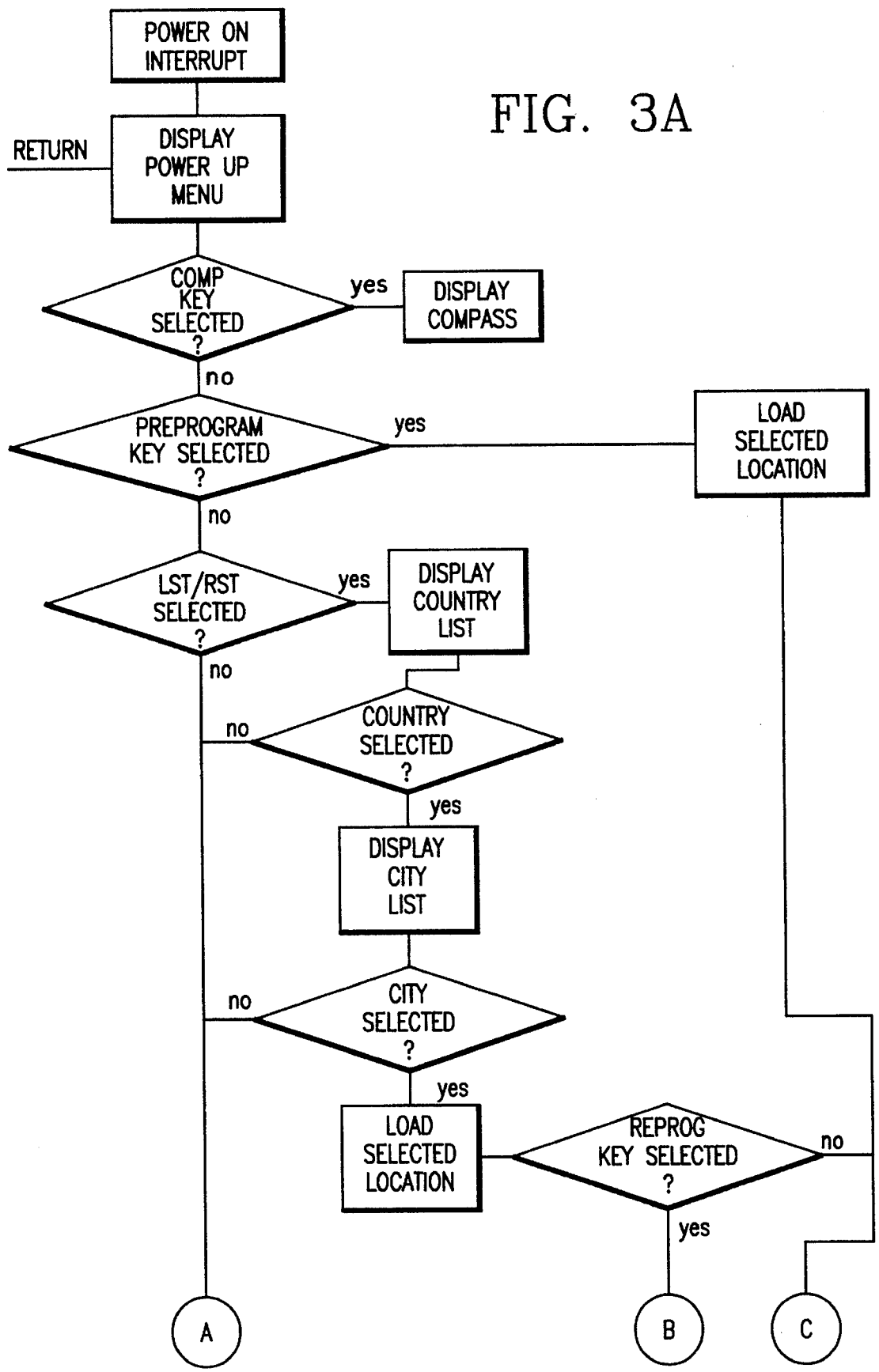
FIGS. 3A and 3B are a logic flow diagram for power-up and the overall operation of the apparatus of FIG. 1.
Figure 3B:
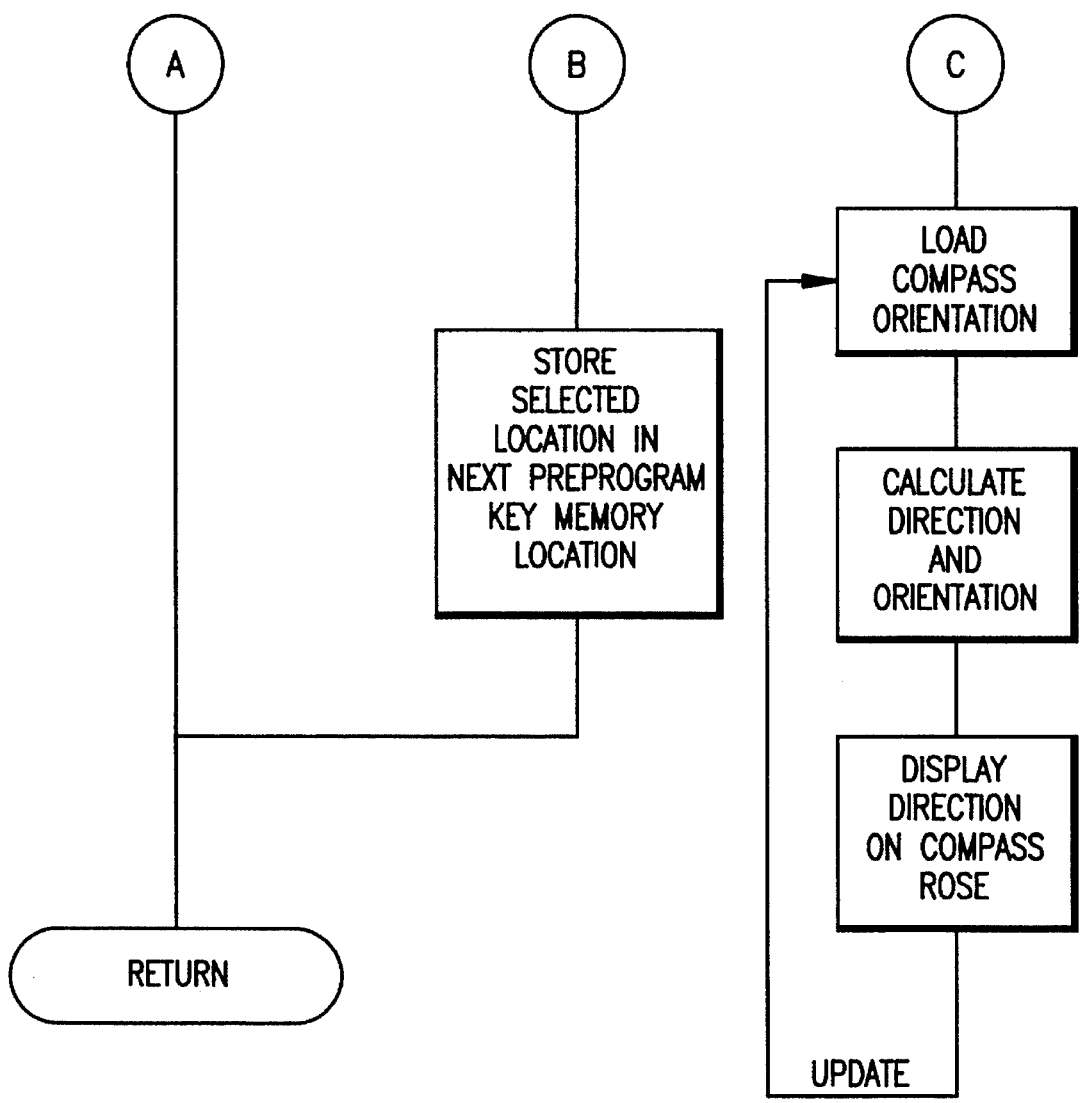

Referring to FIGS. 3A and 3B, the operation of the apparatus 1 will be described in detail.

When the On/Off key 12 is pushed, an interrupt signal is sent to the CPU 25 which causes it to display the power-up menu. The operation of the Compass key 11 at any time causes the apparatus 1 to display the bearing of the magnetic north pole.

With the power-up menu displayed, the operation of any of the preprogrammed keys 13–16 causes the selected city latitude/longitude information to be loaded into the CPU 25. Operation of the select key 24 then causes the CPU 25 to load the compass bearing information from the compass 26, calculate the bearing to Mecca as detailed above, and display the compass rose 6 along with the bearing arrow 7 on the display 3.

In the alternative, operation of the Lst/Rst key 23 replaces the power-up menu with a list of countries which can be scrolled via the cursor control keys 21–23. Once the proper country is highlighted, operation of the select key 24 causes a list of cities within the selected country to be displayed and scrolled again via the keys 21–23. Selection of a highlighted city via the select key 24 causes the latitude/longitude coordinates of the highlighted city to be loaded into the CPU 25. At this point, the user has two options. Operation of the Reprogram function of the key 5 followed by one of the preprogrammed keys 13–16 results in the highlighted city location being stored in the memory address associated with the operated Preprogrammed key. In the alterative, as in the Preprogrammed operation, a second operation of the select key 24 causes the CPU 25 to load the compass bearing information from the compass 26, calculate the bearing to Mecca as detailed above, and display the compass rose 6 along with the bearing arrow 7 on the display 3. A time-out circuit causes the device to turn off when no key has been operated for a predetermined period of time, such as 60 seconds.

Figure 4:
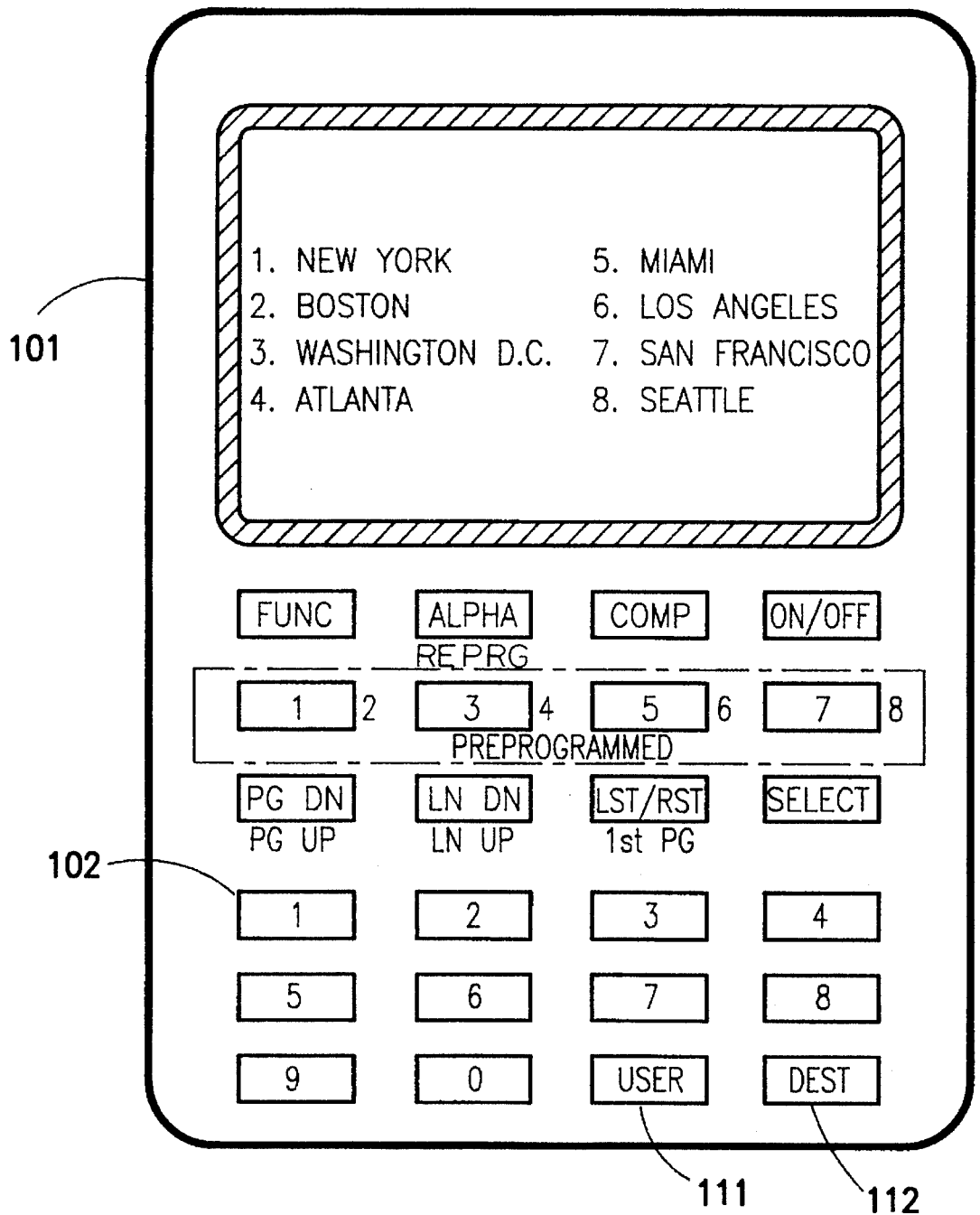
FIG. 4 is a top plan view of a second embodiment of the Ghebleh indicator with a numerical keyboard for inputting a personalized user location list, and illustrating a sample power-up menu.

FIG. 4 is a second embodiment of the apparatus 101 which incorporates a numerical keyboard 102 along with a User data key 111 and a Destination key 112 in addition to the keys found on the apparatus 1 of FIG. 1. In the apparatus 101, the numerical keys 102 can be operated, in conjunction with the User data key 111, to load additional location information into up to ten locations within a User database in the RAM 32. The display 103 is shown in the power-up menu mode, i.e. displaying a list of preprogrammed locations and associated keys. From this display, operation is identical with the operation of the apparatus 1, except that a single operation of the key 111 substitutes a display of the User data base on the screen along with numerical designators for each displayed location. Operation of any of the numerical keys 102 then loads the corresponding location into the CPU 25 and operation of the Select key 24 causes the bearing to Mecca to be calculated and displayed as in FIGS. 3A and 3B.

Pressing the key 111 twice puts the apparatus 101 into a reprogram mode in which a latitude and longitude location is first entered in response to prompts on the display 103. Operation of any of the numerical keys 102 then stores the entered location in that numbered User location within the User database.

The operation of the Destination key 112 temporarily changes the latitude/longitude information for the destination location from Mecca to another preprogrammed location, such as Jerusalem, for example. The change in destination is maintained until later changed by the user. Upon power and memory loss, the destination location is changed back to Mecca.

It should be noted that the keyboard arrangement described above for both embodiments 1 and 101 is merely exemplary and many other key arrangements could be employed. The number of preprogrammed locations in the RAM 32 could be more or less than eight and the number of city locations stored in the ROM 31 could be more or less than 1200, these numbers being merely exemplary. Similarly, the time-out for shutting down the apparatus when no key is selected can be more or less than 60 seconds and, in fact, may be programmable. Furthermore, the manner of displaying the bearing on a compass rose is just one of many display techniques which could be used. For example, the bearing could be indicated as a simple arrow, an arrow associated with a picture of the Kaaba or by a picture of a person praying while oriented in the correct direction. The display 3 could be a small CRT or a magneto-optic display, for example, instead of an LCD.

It is to be understood that while certain forms of the present invention have been illustrated and described herein, it is not to be limited to the specific forms or arrangement of parts described and shown.

We claim:

1. A bearing indicator apparatus for indicating a bearing and orientation between the location of the apparatus and a desired location, the apparatus comprising:

a portable housing;

a keyboard mounted in said housing for inputting positional information;

a display mounted on said housing;

an electronic compass contained within said housing to provide information concerning the current orientation of said apparatus relative to the magnetic North pole;

a microprocessor contained within said housing and connected to said keyboard, said display and said electronic compass, for calculating the bearing to and orientation of the desired location from positional information input from said keyboard, orientation information from said compass and the location of a desired location and displays the bearing on said display.

2. The apparatus of claim 1 wherein said positional information is in a latitude/longitude format.

3. The apparatus of claim 1 wherein said orientation information and said bearing calculated by the microprocessor is relative to true north.

4. The apparatus of claim 1 wherein said orientation information and said bearing calculated by the microprocessor is relative to magnetic north.

5. The apparatus of claim 1 wherein said bearing is indicated on said display as an arrow on a compass rose with the orientation of the apparatus relative to the geographic north pole indicated as well.

6. The apparatus of claim 5 wherein said keyboard comprises a plurality of keys representing memory addresses which contain associated preprogrammed city locations; and the operation of any of said preprogrammed keys loads the latitude/longitude location of the associated city location into the microprocessor as the apparatus location for calculation and display of said bearing.

7. The apparatus of claim 1 wherein said keyboard comprises a plurality of keys representing memory addresses which contain associated preprogrammed city locations and the operation of any of said preprogrammed keys loads the latitude/longitude location of the associated city location into the microprocessor as the apparatus location for calculation and display of said bearing.

8. The apparatus of claim 1 wherein said desired location is the city of Mecca.

9. The apparatus of claim 8 wherein said keyboard comprises an additional key which, when operated, changes the desired location to another preprogrammed location.

10. A bearing indicator apparatus for indicating a bearing and orientation between the location of the apparatus and Mecca, the apparatus comprising:

a portable housing;

a keyboard mounted in said housing for inputting positional information, said keyboard comprising a plurality of keys representing memory addresses which contain associated preprogrammed city locations;

a display mounted on said housing;

a microprocessor contained within said housing and connected to said keyboard and said display;

an electronic compass contained within said housing and connected to said microprocessor to provide said microprocessor with information concerning the current orientation of said apparatus relative to the magnetic North pole, said microprocessor being operative to calculate the bearing to and orientation of Mecca relative to the positional information input from said keyboard, the orientation information from said compass and the location of the desired location, and to display the bearing on said display as an arrow on a compass rose with the orientation of the apparatus relative to the geographic north pole indicated as well.

11. The apparatus of claim 10 wherein said keyboard comprises a plurality of keys representing memory addresses which contain associated preprogrammed city locations and the operation of any of said preprogrammed keys loads the latitude/longitude location of the associated city location into the microprocessor as the apparatus location for calculation and display of said bearing.

12. The apparatus of claim 11 wherein said keyboard comprises a plurality of numerical keys for entering selected locations into and selecting locations from a user location data base.

13. A bearing indicator apparatus for indicating a bearing and orientation between the location of the apparatus and a desired location, the apparatus comprising:

a portable housing;

a user location data base;

a keyboard mounted in said housing for inputting positional information and for entering selected locations into and selecting locations from the user location data base;

a display mounted on said housing;

an electronic compass contained within said housing to provide information concerning the current orientation of said apparatus relative to the magnetic North pole;

a microprocessor contained within said housing and connected to said keyboard, said display and said electronic compass, for calculating the bearing to and orientation of the desired location from positional information input from said keyboard, orientation information from said compass and the location of a desired location and displays the bearing on said display.

* * * * *